(12) United States Patent
Kinoshita et al.

(10) Patent No.: US 6,388,651 B1
(45) Date of Patent: May 14, 2002

(54) PICTURE CONTROL DEVICE AND FLAT-PANEL DISPLAY DEVICE HAVING THE PICTURE CONTROL DEVICE

(75) Inventors: Kohei Kinoshita, Hyogo-ken; Kan Shimizu, Urawa, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/733,702

(22) Filed: Oct. 17, 1996

(30) Foreign Application Priority Data

Oct. 18, 1995 (JP) .............................. 7-269592

(51) Int. Cl.[7] .............................. G09G 3/36; H05K 7/02; H05K 7/14
(52) U.S. Cl. .............................. 345/98; 345/98; 345/100; 361/760; 361/802
(58) Field of Search .................. 345/98, 100; 361/760, 361/802

(56) References Cited

U.S. PATENT DOCUMENTS 5,192,945 A * 3/1993 Kusada ....................... 345/100
5,757,351 A * 5/1998 Lin et al. ..................... 345/98

* cited by examiner

*Primary Examiner*—Jeffery Brier
*Assistant Examiner*—Anthony J Blackman
(74) *Attorney, Agent, or Firm*—Pillsbury Winthrop LLP

(57) ABSTRACT

A picture control device is used for driving a flat-panel display having a plurality of horizontal pixel lines each formed of display pixels arranged in one line, and composed of first and second driver groups which are arranged to divide the display pixels into groups and drive the groups of display pixels, respectively, and a drive circuit board for controlling the driver groups to output pixel data assigned to the respective display pixels during a scanning period for each horizontal pixel line and to drive the display pixels according to the pixel data. In particular, the drive circuit board includes a gate-array control section connected to the first and second driver groups by first and second wiring lines electrically separated from each other, for distributing pixel data assigned to the display pixels of each group to a corresponding driving group via a corresponding wiring line.

32 Claims, 4 Drawing Sheets

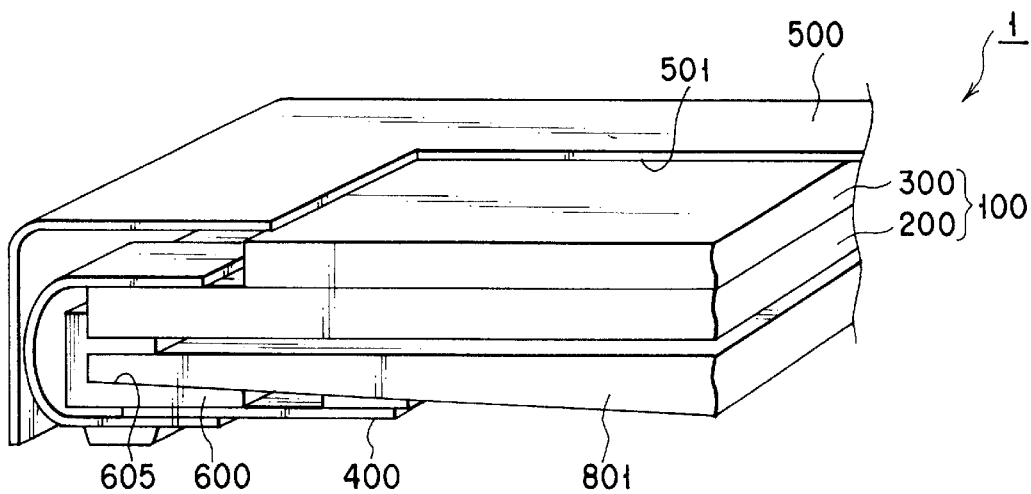
F I G. 2

PICTURE CONTROL DEVICE AND FLAT-PANEL DISPLAY DEVICE HAVING THE PICTURE CONTROL DEVICE

BACKGROUND OF THE INVENTION

This invention relates to a picture control device for a flat-panel display represented by a liquid-crystal display, and a flat-panel display device having the picture control device.

Recently, flat-panel displays, particularly liquid-crystal displays, have become popular as displays for use with personal computers, word processors, and TV displays, because of the advantages of lightweight, thinness, and low power consumption.

A conventional liquid crystal display has, for example, eight X-TCPs (Tape Carrier Packages) 701, 702, 703, 704, 705, 706, 707, 708 arranged along one side edge 101 of a liquid crystal panel 100 as shown in FIG. 1. Each X-TCP is a unit formed of a flexible wiring film and a driver IC which is mounted on the flexible wiring film in the form of a semiconductor chip, and supplies picture signal voltages to signal lines of the liquid crystal panel 100. Although not shown, a plurality of Y-TCPs are arranged along another side edge of the liquid crystal panel 100 to output a scanning pulse to the scanning lines in sequence. Each Y-TCP is a unit formed of a flexible wiring film and a driver IC which is mounted on the flexible wiring film in the form of a semiconductor chip.

The X-TCPs 701, 702, - - - , 708 are connected in cascade, and to a control section G/A in a drive circuit board. The control section G/A generates a horizontal clock signal CK and horizontal start signal ST in synchronism with a system clock signal SCK supplied externally, and also generates pixel data D (R), D (G), D (B) of red (R), green (G), and blue (B) according to video data DATA to be supplied to the X-TCPs 701, 702, - - - , 708 as control signals. The horizontal clock signal CK and the pixel data D (R), D (G), D (B) are commonly supplied to the X-TCPs 701, 702, - - - , 708. The horizontal start signal ST is supplied to the first X-TCP 701, and then transferred sequentially through the X-TCPs 701, 702, - - - , 708. Each of the X-TCP 701, 702, - - - , 708 is constituted by a shift register which outputs the horizontal start signal ST in response to the horizontal clock signal CK while shifting the horizontal start signal ST to the next stage, and a D/A converter which samples the pixel data at the output timing of each horizontal start signal ST, converts the pixel data into a picture signal voltage, and supplies the pixel signal voltage to a signal line corresponding to the stage of outputting the horizontal start signal ST.

Recently, reduction of power consumed by the flat-panel display is strongly demanded. According to a technique conventionally known, power consumption of the flat-panel display is reduced by forcing the D/A converter of each X-TCP to be suspended except for a period of driving a corresponding signal line. However, the demand is not sufficiently satisfied by the technique.

BRIEF SUMMARY OF THE INVENTION

It is, accordingly, an object of the present invention to overcome the disadvantage in the prior art by providing a flat-panel display that fulfills the demand for reduced power consumption.

The foregoing object is accomplished by a picture control device for a flat-panel display device having a plurality of horizontal pixel lines each formed of display pixels arranged in one line, comprising a plurality of driving sections arranged to divide the display pixels into groups, for driving the groups of display pixels, respectively; and a control section for controlling the driving sections to output pixel data assigned to the respective display pixels during a scanning period for each horizontal pixel line and to drive the display pixels according to the pixel data; wherein the control section includes a plurality of data wiring members electrically separated from each other and a data distributing circuit connected to the driving sections by the respective data wiring members, for distributing pixel data assigned to the display pixels of each group to a corresponding driving section via a corresponding data wiring member.

With the picture control device, the control section is constituted by a plurality of data wiring members and a distributing circuit. The data wiring members are electrically separated from each other. The data distributing circuit is connected to the driving sections by the respective data wiring members, and distributes pixel data assigned to the display pixels of each group, to a corresponding driving section via a corresponding data wiring member. Since the wiring length of each data wiring member is shortened to half of the wiring length of a conventional data wiring member which supplies pixel data commonly to all the driving sections, the parasitic capacitance of the control section can be greatly reduced. Accordingly, it is possible to sufficiently reduce the power consumption of the control section while increasing the operation speed of the control section.

BRIEF DESCRIPTION OF THE SEVERAL VIEWS OF THE DRAWING

FIG. 2 is a schematic sectional view showing the structure of a liquid crystal display according to a first embodiment of the present invention;

DETAILED DESCRIPTION OF THE INVENTION

Figure 1:
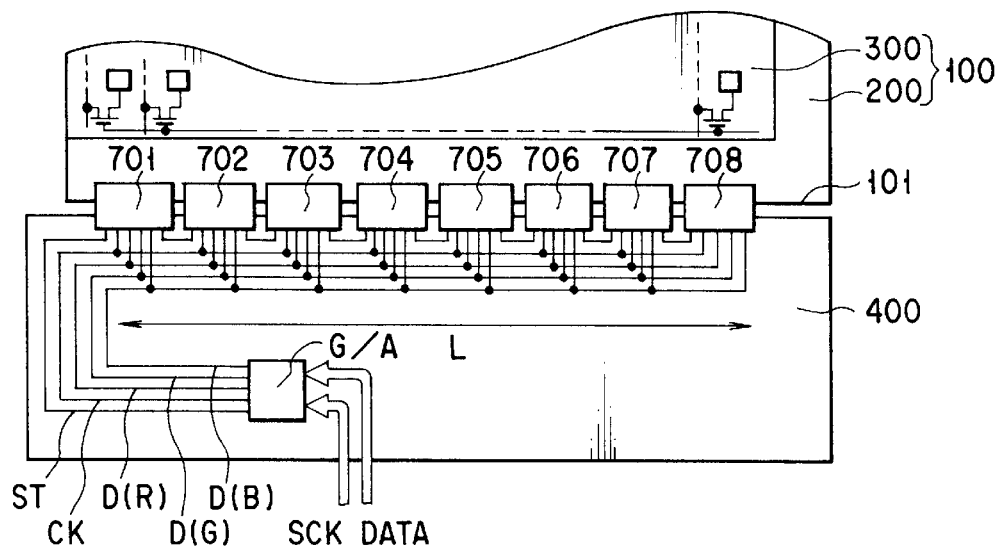
FIG. 1 is a schematic circuit diagram showing part of a conventional liquid crystal display.

A liquid crystal display 1 according to a first embodiment of the present invention will now be described with reference to the accompanying drawings.

The liquid crystal display 1 includes a liquid crystal panel 100 as shown in FIG. 2. The liquid crystal panel 100 is composed of an array substrate 200, a counter substrate 300, and a liquid crystal layer held between the substrates 200 and 300. The array substrate includes (640×3) signal lines 220 and 480 scanning lines 210, thin-film transistors 230 (hereinafter, referred to as TFTs) connected to the signal lines 220 and scanning lines 210, and a matrix array of pixel electrodes 240 connected to the TFTs 230, all on a glass plate. The pixel electrodes 240 in each row serves as one horizontal pixel line which is driven by picture signal voltages supplied during one horizontal scanning period. Each TFT 230 is formed using an active layer of amorphous silicon as a base component. The counter substrate 300 includes a counter electrode and color filter layer formed on a glass plate. The liquid crystal layer contains liquid crystal materials held in contact with orientation films which are formed on the array substrate 200 and counter substrates 300, respectively.

Figure 3:
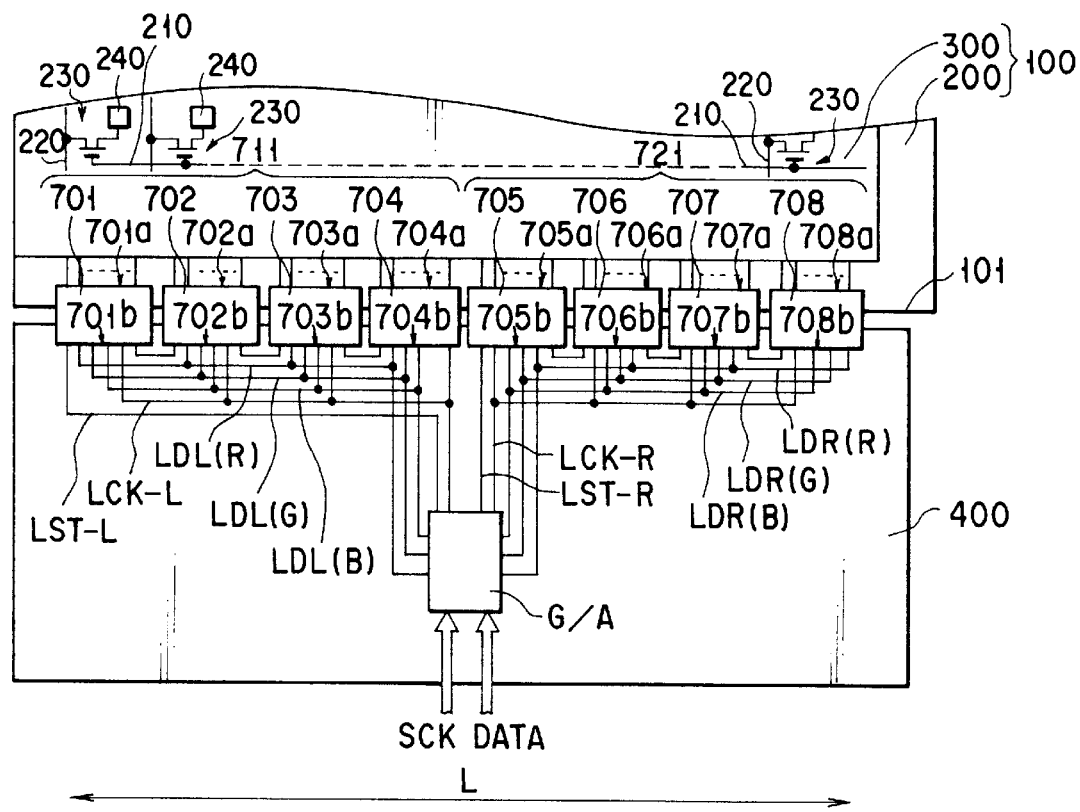
FIG. 3 is a schematic circuit diagram showing part of the liquid crystal display shown in FIG. 2.

As shown in FIGS. 2 and 3, the liquid crystal display 1 includes eight X-TCPs 701, 702, - - - , 708 arranged along one side edge 101 of the liquid crystal panel 100. Each of the X-TCP 701, 702, - - - , 708 is a unit formed of a flexible wiring film and a driver IC which is mounted on the flexible wiring film in the form of a semiconductor chip. The X-TCP 701, 702, - - - , 708 have sets of 240 output terminal sets 701a, 702a, 703a, 704a, 705a, 706a, 707a, 708a which are connected to ends of the signal lines of the liquid crystal panel 100 to supply picture signal voltages, and sets of input terminals 701b, 702b, 703b, 704b, 705b, 706b, 707b, 708b of the X-TCPs 701, 702, - - - , 708 which are connected to a drive circuit board 400. The X-TCP 701, 702, 703, 704 constitute the first driver group 711, and the X-TCP 705, 706, 707, 708 constitute the second driver group 721. The color display pixels of each horizontal pixel line are divided into first and second groups to be driven by the first and second driver groups 711 and 721, respectively. Further, two Y-TCPs (not shown) are arranged along another side edge of the liquid crystal panel 100 to output a scanning pulse to each scanning line 210.

As shown in FIG. 2, the liquid crystal panel 100 is interposed between the first frame 500 made of a metal box having an opening 501 for the display area and the second frame 600 made of a resin frame, and secured to the frames 500 and 600 with screws in the four corners, or at four points on diagonal lines.

The second frame 600 holds a wedge-like light-guiding plate 801 made of acrylic resin, and a tubular light source (not shown) positioned close to one end of the light-guiding plate 801. The light-guiding plate 801 includes a milky printing pattern (not shown) which is provided on the side opposite to the liquid crystal panel 100 and selectively directing the light from the tubular light source to the liquid crystal panel 100. Light-scattering grooves may be formed integrally with the light-guiding plate in place of the printing pattern. The second frame 600 of resin is formed integrally or separately, houses the light-guiding plate 801 and tubular light source stacked in the direction of its thickness, and holds and secure the light-guiding plate 801 by means of a housing groove 605. The second frame 600 holds the drive circuit board 400 on a rear surface area of the light-guiding plate 801 which is located on the thinner side.

The circuit configuration of the liquid crystal display 1 will be described in detail with reference to FIG. 3.

The liquid crystal display 1 includes a gate-array control section G/A which is disposed on the drive control board 400 and controls the X-TCPs 701, 702, 703, 704, 705, 706, 707, 708 to be operate independently. The gate-array control section G/A generates a horizontal clock signal CK-L and horizontal start signal ST-L in synchronism with the system clock signal SCK supplied externally, generates pixel data streams DL(R), DL(G), DL(B) assigned to the red (R), green (G), and blue (B) display pixels of the first group in accordance with video data DATA, and supplies the horizontal clock signal CK-L, horizontal start signal ST-L, and pixel data streams DL(R), DL(G), DL(B) to the first driver group 711 as control signals. On the other hand, the gate-array control section G/A generates a horizontal clock signal CK-R and horizontal start signal ST-R in synchronism with the system clock signal SCK supplied externally, generates pixel data streams DR(R), DR(G), DR(B) assigned to the red (R), green (G), and blue (B) display pixels of the second group in accordance with the video data DATA, and supplies the horizontal clock signal CK-R, horizontal start signal ST-R, and pixel data streams DR(R), DR(G), DR(B) to the second driver group 721 as control signals.

The horizontal clock signal CK-L and pixel data streams DL(R), DL(G), DL(B) are supplied in parallel to the X-TCP 701, 702, 703, 704 via a wiring line LCK-L and wiring lines LDL(R), LDL(G), LDL(B). The horizontal start signal ST-L is supplied via a wiring line LST-L to the first X-TCP 701, and then sequentially transferred through the X-TCP 701, 702, 703, 704. For this operation, the X-TCP 701, 702, 703, 704 are connected in cascade. Each of the X-TCP 701, 702, 703, 704 is composed of a shift register for shifting the horizontal start signal ST-L to the next stage while outputting the horizontal start signal ST-L, in response to the horizontal clock signal CK-L, and a D/A converter for sampling pixel data at an output timing of each horizontal start signal ST-L, converting the pixel data into a picture signal voltage, and supplying the picture signal voltage to a signal line 220 corresponding to the stage which has output the horizontal start signal ST-L.

The horizontal clock signal CK-R and pixel data streams DR(R), DR(G), DR(B) are supplied in parallel to the X-TCP 705, 706, 707, 708 via a wiring line LCK-R and wiring lines LDR(R), LDR(G), LDR(B). The horizontal start signal ST-R is supplied via a wiring line LST-R to the first X-TCP 705, and then sequentially transferred through the X-TCP 705, 706, 707, 708. For this operation, the X-TCP 705, 706, 707, 708 are connected in cascade. Each of the X-TCP 705, 706, 707, 708 is composed of a shift register for shifting the horizontal start signal ST-R while outputting the horizontal start signal ST-R, in response to the horizontal clock signal CK-R, and a D/A converter for sampling pixel data at an output timing of each horizontal start signal ST-R, converting the pixel data into a picture signal voltage, and supplying the picture signal voltage to a signal line 220 corresponding to the stage which has output the horizontal start signal ST-R.

The gate-array control section G/A is disposed in a center area of the drive circuit board 400, which is the same distance from the driver groups 711 and 721, so that the lengths of the wiring lines LDL(R), LDL(G), LDL(B) and the lengths of the wiring lines LDR(R), LDR(G), LDR(B) can be about half the total length of the X-TCP 701, 702, - - - , 708. The wiring lines LDL(R), LDL(G), LDL(B) and the wiring lines LDR(R), LDR(G), LDR(B) are disposed almost symmetrically with respect to the gate-array control section G/A. This makes the lengths of the wiring lines sufficiently short, and the wiring capacitances, wiring resistance, and inductances of the wiring lines almost equal.

Figure 4:
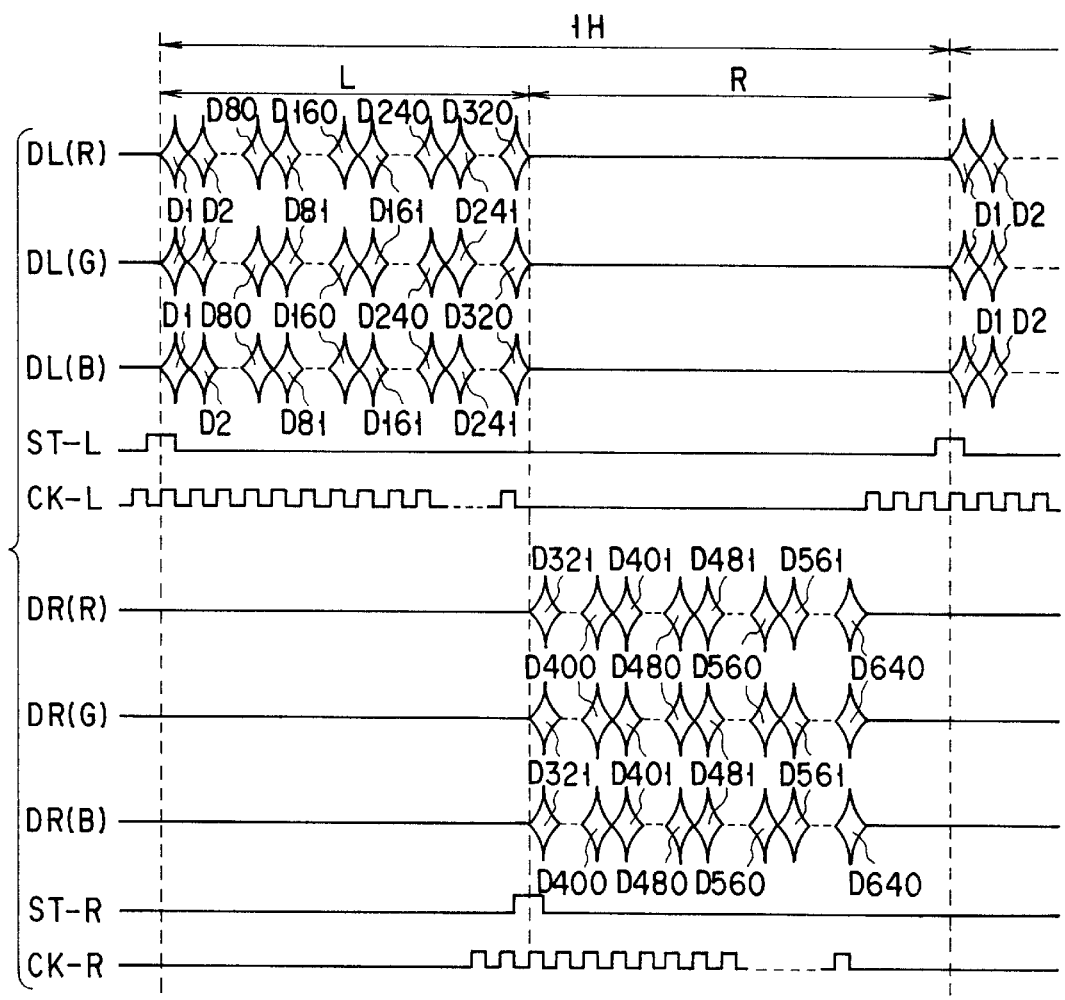
FIG. 4 is a timechart for explaining the operation of the liquid crystal display shown in FIG. 2.

The gate-array control section G/A is designed to perform, as shown in FIG. 4, an output operation of supplying the pixel data streams DL(R), DL(G), DL(B), the horizontal start signal ST-L, and the horizontal clock signal CK-L in the first half of a horizontal scanning period (1 H) and to stop the output operation in the latter half of the period. In addition, the gate-array control section G/A is further designed to stop, as shown in FIG. 4, an output operation of supplying the pixel data streams DR(R), DR(G), DR(B), the horizontal start signal ST-R, and the horizontal clock signal CK-R in the first half of a horizontal scanning period (1 H) and to perform the output operation in the latter half of the period. Moreover, each of the X-TCPs 701, 702, - - - , 708 can be designed to be suspended except for a period in which the shifting operation is repeated according to the number of corresponding signal lines.

In the present embodiment, each of the horizontal clock signals CK-L and CK-R is a particularly high-frequency signal, and the waveform at the beginning of the operation differs from the waveform in the steady state. Therefore, the horizontal clock signal CK-L is delivered before the pixel data streams DL(R), DL(G), DL(B) in each horizontal scanning period. The the pixel data streams DL(R), DL(G), DL(B) are delivered after the horizontal clock signal CK-L becomes to be in the steady state. In the same manner as described above, the horizontal clock signal CK-R is delivered before the pixel data streams DR(R), DR(G), DR(B) in each horizontal scanning period. The the pixel data streams DR(R), DR(G), DR(B) are delivered after the horizontal clock signal CK-R becomes to be in the steady state.

With the above configuration, the lengths of the wiring lines for supplying control signals including the pixel data streams DL(R), DL(G), DL(B), the horizontal start signal ST-L, and the control signals, and the horizontal clock signal CK-L from the gate-array control section G/A to the X-TCPs 701, 702, 703, 704 of the first driver group 711, and the lengths of the wiring lines for supplying control signals including pixel data streams DR(R), DR(G), DR(B), the horizontal start signal ST-R, and the horizontal clock signal CK-R from the gate-array control section G/A to the X-TCPs 705, 706, 707, 708 of the second driver group 721 are shortened to about half of the wiring line length in the configuration of FIG. 1.

In addition, the first driver group 711 is driven in a different time slot of a horizontal scanning period from the time slot in which the second driver group 721 is driven in such a manner that at least while one group is being operated, the pixel data streams are stopped from being supplied to the other driver group.

This reduces the capacitive load on the gate-array control section G/A to half of that in the configuration of FIG. 1, which thereby decreases the electric power consumed by the output buffer of the gate-array control section G/A to about half, achieving less power consumption in the entire device. According to the embodiment, an excellent display image was practically obtained in an XGA-type liquid crystal display of 21 inches.

Figure 5:
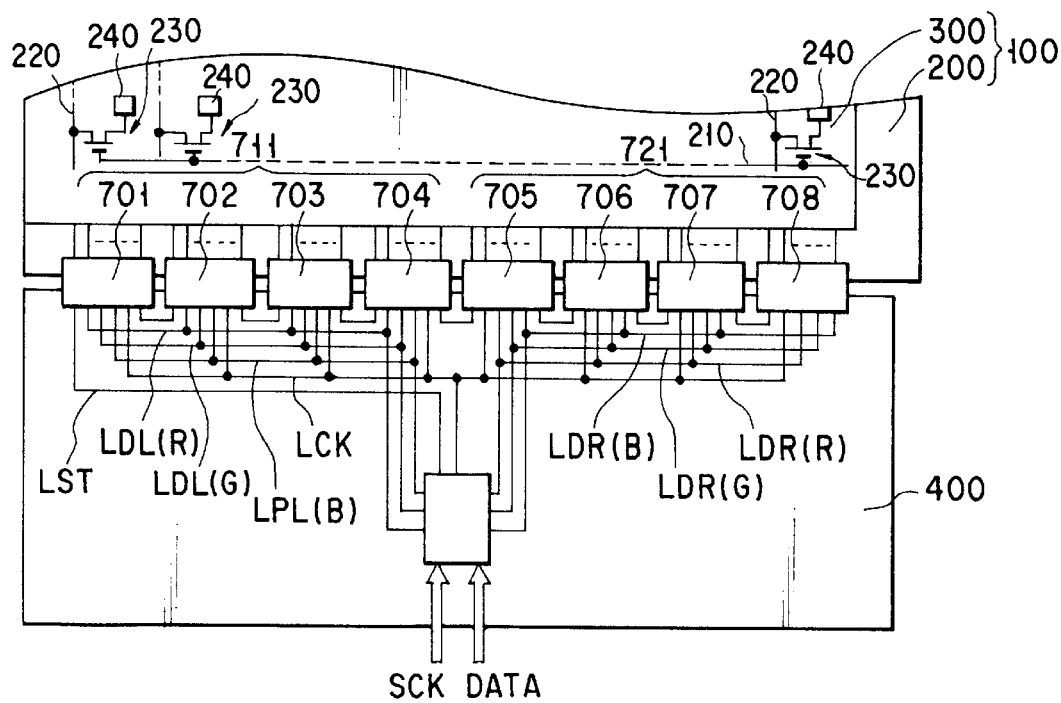
FIG. 5 is a schematic circuit diagram showing part of a liquid crystal display according to a second embodiment of the present invention.

Next, a liquid crystal display according to the second embodiment of the present invention will be described with reference to FIG. 5. This liquid crystal display is similar to that in the above embodiment in basic configuration, so the same components will be explained briefly and different components will be described in detail.

The liquid crystal display 1 includes a gate-array control section G/A which is disposed on the drive control board 400 and controls the X-TCPs 701, 702, 703, 704, 705, 706, 707, 708 to be operate independently. The gate-array control section G/A generates a horizontal clock signal CK and horizontal start signal ST in synchronism with the system clock signal SCK supplied externally, generates pixel data streams DL(R), DL(G), DL(B) assigned to the red (R), green (G), and blue (B) display pixels of the first group in accordance with video data DATA, and supplies the horizontal clock signal CK, horizontal start signal ST, and pixel data streams DL(R), DL(G), DL(B) to the first driver group 711 as control signals. The gate-array control section G/A further generates pixel data streams DR(R), DR(G), DR(B) assigned to the red (R), green (G), and blue (B) display pixels of the second group in accordance with the video data DATA, and supplies the horizontal clock signal CK described above and the pixel data streams DL(R), DL(G), DL(B) to the second driver group 721 as control signals.

The pixel data streams DL(R), DL(G), DL(B) are supplied in parallel to the X-TCP 701, 702, 703, 704 via wiring lines LDL(R), LDL(G), LDL(B). The horizontal start signal ST is supplied via a wiring line LST to the first X-TCP 701, and then sequentially transferred through the X-TCP 701, 702, - - -, 708. For this operation, the X-TCP 701, 702, - - -, 708 are connected in cascade. The pixel data streams DR(R), DR(G), DR(B) are supplied in parallel to the X-TCP 705, 706, 707, 708 via wiring lines LDR(R), LDR(G), LDR(B). The horizontal clock signal CK is supplied each of the X-TCP 701, 702, - - -, 708 via a common wiring line LCK.

With the above configuration, the lengths of the wiring lines for supplying control signals including the pixel data streams DL(R), DL(G), DL(B), the horizontal start signal ST-L, and the control signals, and the horizontal clock signal CK-L from the gate-array control section G/A to the X-TCPs 701, 702, 703, 704 of the first driver group 711, and the lengths of the wiring lines for supplying control signals including pixel data streams DR(R), DR(G), DR(B), the horizontal start signal ST-R, and the horizontal clock signal CK-R from the gate-array control section G/A to the X-TCPs 705, 706, 707, 708 of the second driver group 721 are shortened to about half of the wiring line length in the configuration of FIG. 1.

In addition, the first driver group 711 is driven in a different time slot of a horizontal scanning period from the time slot in which the second driver group 721 is driven in such a manner that at least while one group is being operated, the pixel data streams are stopped from being supplied to the other driver group.

This reduces the capacitive load on the gate-array control section GSA to half of that in the configuration of FIG. 1, which thereby decreases the electric power consumed by the output buffer of the gate-array control section G/A to about half, achieving less power consumption in the entire device. As compared with the first embodiment, the present embodiment has the advantages that the timing control for making the horizontal clock signal CK steady is not necessary between the first and second driver groups 711 and 721, and the circuit configuration is simplified, although the capacitive load on the gate-array control section G/A is increased, because the gate-array control section G/A supplies the horizontal clock signal CK to the X-TCPs 701, 702, - - -, 708 in the first and second driver groups 711 and 721 in parallel with each other via the common wiring line LCK over a horizontal scanning period. In addition, the number of output pins of the gate-array control section G/A can be reduced. According to the embodiment, an excellent display image was practically obtained in an XGA-type liquid crystal display of 21 inches.

The first and second embodiments employ X-TCPs each composed of a driver IC which is mounted on a flexible wiring film in the form of a semiconductor chip. However, for example, the wiring lines for the driver IC may be formed on the array substrate. The driver IC can be mounted on the array substrate in the form of a semiconductor chip by a COG (Chip On Glass) technique. Further, the driver IC may be formed in the array substrate integrally with scanning lines, signal lines, pixel electrodes, and TFTs.

Figure 6:
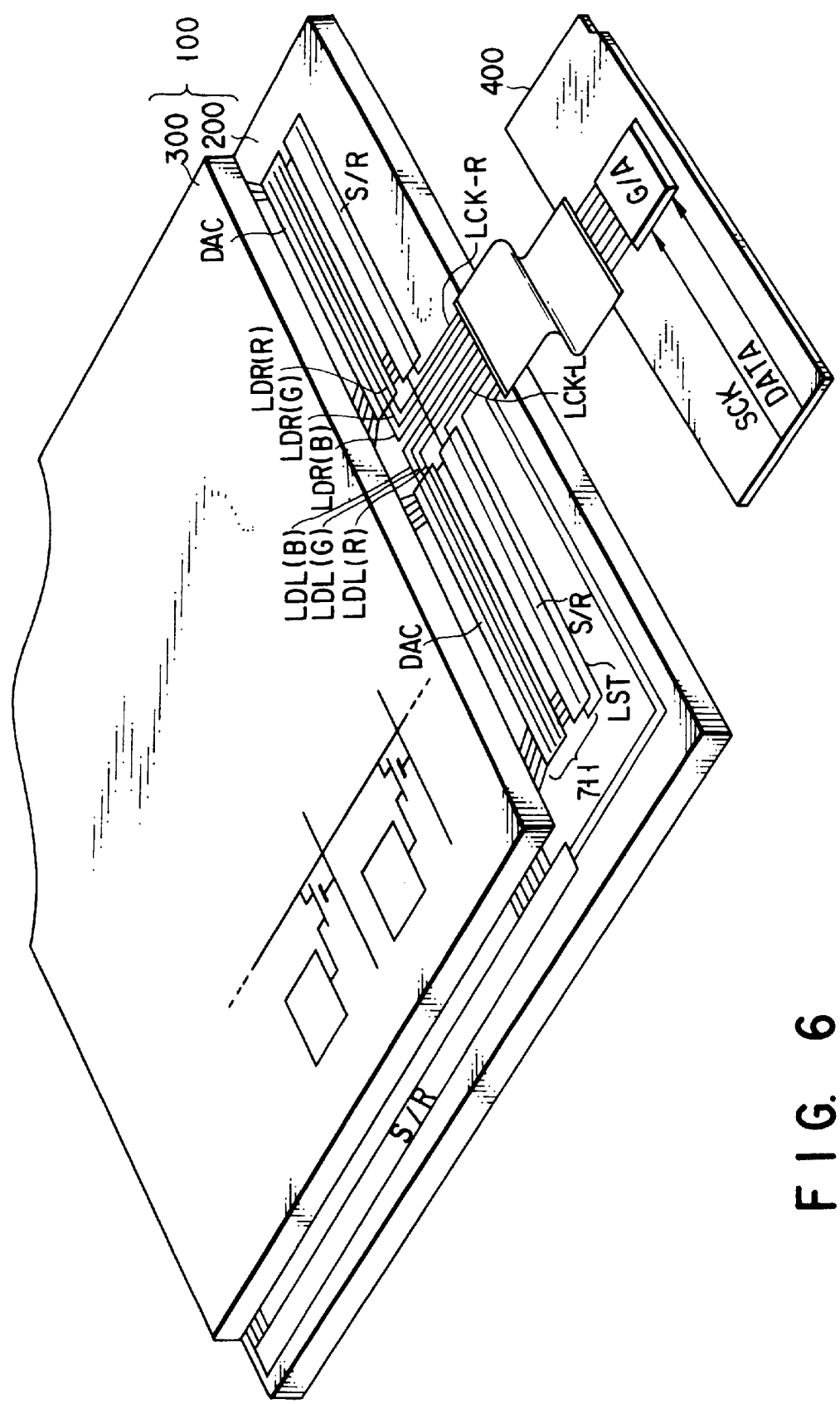
FIG. 6 is a schematic circuit diagram showing part of a liquid crystal display according to a third embodiment of the present invention.

FIG. 6 is a schematic view of a liquid crystal display according to the third embodiment of the present invention. This liquid crystal display has the same configuration as that of the liquid crystal display in the first and second embodiments except for the points described below. In the liquid crystal display according to the third embodiment, the circuitry of the driver groups 711 and 721 is formed on the array substrate 200 by using TFTs each of which has an active layer of poly-silicon serving as a base component. Like the first and second embodiments, the pixel data streams DL(R), DL(G), DL(B) are supplied via the wiring lines LDL(R), LDL(G), LDL(B) to the first driver group 711, and the pixel data streams DR(R), DR(G), DR(B) are supplied via the wiring lines LDR(R), LDR(G), LDR(B) to the second driver group 721. The clock signal CK-L and CK-R are supplied via the wiring lines LCK-L and LCK-R to the driver groups 711 and 721, like the first embodiment. The horizontal start signal ST is supplied via the wiring line LST to the driver group 711, like the second embodiment. The horizontal start signal ST is supplied from the driver group 711 to the driver group 721 after half of the horizontal scanning period has been elapsed.

The wiring lines LDL(R), LDL(G), LDL(B), the wiring lines LDR(R), LDR(G), LDR(B), the wiring lines LCK-L and LCK-R, and the wiring line LST are constituted by a flexible wiring film provided between the array substrate 200 and the drive circuit board 400 and a wiring pattern formed on the array substrate 200.

In this embodiment, the gate-array control section G/A is disposed in a center area between the first and second driver groups 711 and 721, so that the wiring lines LDL(R), LDL(G), LDL(B) and the wiring lines LDR(R), LDR(G), LDR(B) are disposed almost symmetrically with respect to the gate-array control section G/A. Therefore, the advantages described in the first and second embodiments can be also obtained. Further, since the first and second driver groups 711 and 721 and the wiring pattern thereof are formed as circuit components of the array substrate 200, a mounting process of driver IC chips is not required, for example. The structure in which the first and second driver groups 711 and 721 are formed together with the wiring pattern thereof on the array substrate 200, is preferable in the following case. That is, if it is required that the gate-array control section G/A is disposed in a part other than the center area between the first and second driver groups 711 and 721, the wiring pattern can be determined by taking the internal wiring capacitances and internal wiring resistances of the first and second driver groups 711 and 721 into consideration. Also in this embodiment, the liquid crystal display was confirmed to be operable at a high speed.

The present invention is not limited to the first to third embodiment described above. For example, the clock signal CK can be supplied to the first and second driver groups 711 and 721 via two wiring lines electrically separated from each other, whereas each of the pixel data streams D(R), D(G), D(B) and start signal ST is supplied to the first and second driver groups 711 and 721 via a common wiring line.

In the embodiments described above, the driver groups for outputting picture signal voltages to the signal lines of the liquid crystal display are arranged along one side edge of the liquid crystal panel to make the device compact. However, it is possible to provide a plurality of driver groups arranged along first and second side edges opposing each other and controlled by a common gate-array control section G/A or independent first and second gate-array control sections G/A.

What is claimed is:

1. A picture control device for a flat-panel display having a plurality of horizontal pixel lines each formed of display pixels arranged in one line, comprising:

a plurality of driving sections arranged along one side edge of said flat-panel display substantially parallel to said horizontal pixel lines to divide said display pixels into groups, for driving the groups of display pixels, respectively; and a control section for controlling said driving sections to output pixel data assigned to the respective display pixels during a scanning period for each horizontal pixel line and to drive said display pixels according to the pixel data, wherein said control section includes a plurality of data wiring members assigned to said driving sections and electrically separated from each other and distributing means disposed at a position corresponding to a center of said one side edge and connected to said driving sections by two sets of the data wiring members such that respective data wiring members of each of the two sets are of approximate equal lengths so as to uniformly reduce parasitic capacitance thereof and power consumption of the control section, for distributing pixel data assigned to said display pixels of each group to a corresponding driving section via a corresponding data wiring member.

2. A picture control device according to claim 1, wherein said plurality of driving sections are first and second driving sections which are arranged to divide said display pixels into groups and drive the first and second groups of display pixels, respectively;

said plurality of data wiring members are a first data wiring member extending from said distributing means to said first driving section or an inside thereof and a second data wiring member extending from said distributing member to said second driving section or an inside thereof; and the lengths of the first and second data wiring members are determined to be equal to each other.

3. A picture control device according to claim 2, wherein said first and second data wiring members are arranged symmetrically with respect to said distributing means.

4. A picture control device according to claim 2, wherein said first and second driving sections are arranged for sequentially selecting display pixels for one group under a control of a selection control signal to drive the respective first and second groups of display pixels according to pixel data assigned thereto, and said distributing means is connected to said first and second driving sections by first and second selection control wiring members which are electrically separated from each other, to supply the selection control signal to the first and second driving sections.

5. A picture control device according to claim 4, wherein said distributing means is arranged for distributing said selection control signal to each of the first and second driving sections via a corresponding one of said first and second selection control wiring members.

6. A picture control device according to claim 2, wherein said first and second driving sections are arranged for sequentially selecting display pixels for one block under a control of a selection control signal to drive the respective first and second groups of display pixels according to pixel data assigned thereto, and said distributing means is connected to said first and second driving sections by a common selection control wiring member to supply the selection control signal to the first and second driving sections.

7. A picture control device according to claim 1, wherein each driving section includes a unit formed of a flexible wiring film connected to said flat-panel display and a driver IC which is mounted on said flexible wiring film in the form of a semiconductor chip.

8. A picture control device according to claim 1, wherein each driving section includes a driver IC which is mounted on said flat-panel display in the form of a semiconductor chip.

9. A picture control device according to claim 1, wherein each driving section includes a driver IC formed integrally with said flat-panel display.

10. A picture control device for a flat-panel display having a plurality of horizontal pixel lines each formed of display pixels arranged in one line, comprising:

a plurality of driving sections arranged along one side edge of said flat-panel display substantially parallel to said horizontal pixel lines to divide said display pixels into groups, for driving the groups of display pixels, respectively; and a control section for controlling said driving sections to output pixel data assigned to the respective display pixels during a scanning period for each horizontal pixel line and to drive said display pixels according to the pixel data, wherein said plurality of driving sections are arranged for sequentially selecting display pixels for one group under a control of a selection control signal to drive the respective groups of display pixels according to pixel data assigned thereto, said control section includes a plurality of selection control wiring members assigned to said driving sections and electrically separated from each other and distributing means disposed at a position corresponding to a center of said one side edge and connected to said driving sections by two sets of the selection control wiring members such that respective selection control wiring members of each of the two sets are of approximate equal lengths so as to uniformly reduce parasitic capacitance thereof and power consumption of the control section, for distributing the selection control signal to the driving sections.

11. A picture control device according to claim 10, wherein said plurality of driving sections are first and second driving sections which are arranged to divide said display pixels into groups and drive the first and second groups of display pixels, respectively;

said plurality of selection control wiring members. are a first selection control wiring member extending from said distributing means to said first driving section or an inside thereof and a second selection control wiring member extending from said distributing member to said second driving section or an inside thereof; and the lengths of the first and second selection control wiring members are determined to be equal to each other.

12. A picture control device according to claim 11, wherein said first and second selection control wiring members are arranged symmetrically with respect to said distributing means.

13. A picture control device according to claim 11, wherein said distributing means is arranged for distributing said selection control signal to each of the first and second driving sections via a corresponding one of said first and second selection control wiring members.

14. A picture control device according to claimed 10, wherein each driving section includes a unit formed of a flexible wiring film connected to said flat-panel display and a driver IC which is mounted on said flexible wiring film in the form of a semiconductor chip.

15. A picture control device according to claim 10, wherein each driving section includes a driver IC which is mounted on said flat-panel display in the form of a semiconductor chip.

16. A picture control device according to claim 10, wherein each driving section includes a driver IC formed integrally with said flat-panel display.

17. A flat-panel display device comprising:

a flat-panel display which has a plurality of horizontal pixel lines each formed of display pixels arranged in one line; and a picture control device for said flat-panel display, said picture control device including:

a plurality of driving sections arranged along one side edge of said flat-panel display substantially parallel to said horizontal pixel lines to divide said display pixels into groups, for driving the groups of display pixels, respectively; and a control section for controlling said driving sections to output pixel data assigned to the respective display pixels during a scanning period for each horizontal pixel line and to drive said display pixels according to the pixel data, wherein said control section includes a plurality of data wiring members assigned to said driving sections and electrically separated from each other and distributing means disposed at a position corresponding to a center of said one side edge and connected to said driving sections by two sets of data wiring members such that respective data wiring members of each of the two sets are of approximate equal lengths so as to uniformly reduce parasitic capacitance thereof and power consumption of the control section, for distributing pixel data assigned to said display pixels of each group to a corresponding data wiring member.

18. A flat-panel display device according to claim 17, wherein said plurality of driving sections are first and second driving sections which are arranged to divide said display pixels into groups and drive the first and second groups of display pixels, respectively;

said plurality of data wiring members are a first data wiring member extending from said distributing means to said first driving section or an inside thereof and a second data wiring member extending from said distributing member to said second driving section or an inside thereof; and the lengths of the first and second data wiring members are determined to be equal to each other.

19. A flat-panel display device according to claim 18, wherein said first and second data wiring members are arranged symmetrically with respect to said distributing means.

20. A flat-panel display device according to claim 18, wherein said first and second driving sections are arranged for sequentially selecting display pixels for one group under a control of a selection control signal to drive the respective first and second groups of display pixels according to pixel data assigned thereto, and said distributing means is connected to said first and'second driving sections by first and second selection control wiring members which are electrically separated from each other, to supply the selection control signal to the first and second driving sections.

21. A flat-panel display device according to claim 20, wherein said distributing means is arranged for distributing said selection control signal to each of the first and second driving sections via a corresponding one of said first and second selection control wiring members.

22. A flat-panel display device according to claim 18, wherein said first and second driving sections are arranged for sequentially selecting display pixels for one block under a control of a selection control signal to drive the respective first and second groups of display pixels according to pixel data assigned thereto, and said distributing means is connected to said first and second driving sections by a common selection control wiring member to supply the selection control signal to the first and second driving sections.

23. A flat-panel display device according to claim 17, wherein each driving section includes a unit formed of a flexible wiring film connected to said flat-panel display and a driver IC which is mounted on said flexible wiring film in the form of a semiconductor chip.

24. A flat-panel display device according to claim 17, wherein each driving section includes a driver IC which is mounted on said flat-panel display in the form of a semiconductor chip.

25. A flat-panel display device according to claim 17, wherein each driving section includes a driver IC formed integrally with said flat-panel display.

26. A flat-panel display device comprising:
   a flat-panel display having a plurality of horizontal pixel lines each formed of display pixels arranged in one line; and
   a picture control device for flat-panel display, said picture control device including:
      a plurality of driving sections arranged along one side edge of said flat-panel display substantially parallel to said horizontal pixel lines to divide said display pixels into groups, for driving the groups of display pixels, respectively; and
      a control section for controlling said driving sections to output pixel data assigned to the respective display pixels during a scanning period for each horizontal pixel line and to drive said display pixels according to the pixel data,
      wherein said plurality of driving sections are arranged for sequentially selecting display pixels for one group under a control of a selection control signal to drive the respective groups of display pixels according to pixel data assigned thereto, said control section includes a plurality of selection control wiring members assigned to said driving sections and electrically separated from each other and distributing means disposed at a position corresponding to a center of said one side edge and connected to said driving sections by two sets of the selection control wiring members such that respective selection control wiring members of each of the two sets are of approximate equal lengths so as to uniformly reduce parasitic capacitance thereof and power consumption of the control section, for distributing the selection control signal to the driving sections.

27. A flat-panel display device according to claim 26, wherein said plurality of driving sections are first and second driving sections which are arranged to divide said display pixels into groups and drive the first and second groups of display pixels, respectively;
   said plurality of selection control wiring members are a first selection control wiring member extending from said distributing means to said first driving section or an inside thereof and a second selection control wiring member extending from said distributing member to said second driving section or an inside thereof; and
   the lengths of the first and second selection control wiring members are determined to be equal to each other.

28. A flat-panel display device according to claim 27, wherein said first and second selection control wiring members are arranged symmetrically with respect to said distributing means.

29. A flat-panel display device according to claim 27, wherein said distributing means is arranged for distributing said selection control signal to each of the first and second driving sections via a corresponding one of said first and second selection control wiring members.

30. A flat-panel display device according to claim 26, wherein each driving section includes a unit formed of a flexible wiring film connected to said flat-panel display and a driver IC which is mounted on said flexible wiring film in the form of a semiconductor chip.

31. A flat-panel display device according to claim 26, wherein each driving section includes a driver IC which is mounted on said flat-panel display in the form of a semiconductor chip.

32. A flat-panel display device according to claim 26, wherein each driving section includes a driver IC formed integrally with said flat-panel display.

* * * * *